Patented May 4, 1954

2,677,642

UNITED STATES PATENT OFFICE 2,677,642

PURIFICATION OF ENZYMES

Frank B. Ablondi, Pearl River, N. Y., and Stephen Nalesnyk, Park Ridge, N. J., assignors to American Cyanamid Company, New York, N. Y., a corporation of Maine No Drawing. Application August 3, 1951,
Serial No. 240,296

14 Claims. (Cl. 167—73)

This invention relates to improvements in the art of purifying enzymes or enzyme mixtures.

Many enzymes are now being produced on a large scale by fermentation procedures. Perhaps the most important of such enzymes are streptokinase and streptodornase which are produced by the fermentation growth of beta-hemolytic streptococci of the Lansfield groups A, "human" C and G. Mixtures of streptokinase and streptodornase have been found to be useful in the lysis of purulent exudates and in the lysis of blood clots. Since these enzymes are often used under conditions where harm could result if they were contaminated with toxic substances, it is necessary that the enzymes be obtained in a relatively pure state in order that side effects will be reduced to a minimum.

Since the problems and conditions encountered in the purification of streptokinase and streptodornase are typical of those encountered in the purification of other enzymes produced by the fermentation of microorganisms, this invention will be described primarily as applied to the purification of streptokinase and streptodornase although it should be remembered that the invention is applicable to the purification of other enzymes produced by fermentation.

Several procedures are available for purifying enzymes or other proteins which can be employed in the purification of mixtures of streptokinase and streptodornase; however, none of these have proved to be quite satisfactory in all respects. The purification of mixtures of streptokinase and streptodornase is a very difficult problem because the streptococci producing these enzymes also produce other proteinaceous material and in addition the fermentation media on which such bacteria are usually grown contain proteinaceous material from which the resulting enzymes must ultimately be separated. In other words, the desired enzymes, streptokinase and streptodornase, are recovered from the fermentation media along with many other proteins and enzymes as well as nucleoproteins and other proteinaceous impurities and the separation of the enzymes from these closely related and complex materials has proved to be quite difficult.

Christensen (Journal of General Physiology, vol. XXX, pages 465–473) has shown the use of protamine for the purification of an enzyme material comprising streptokinase. While the Christensen procedure represents an advance in the art it nevertheless has several serious disadvantages. The first disadvantage of the above procedure is that it gives inconsistent and unpredictable results with the various protamines of commerce. With some protamines the process gives completely unsatisfactory results. A second disadvantage is that the process gives inconsistent and unpredictable results with enzymes obtained from various fermentation media or different fermentations on the same medium, and a third disadvantage is that the process is operable over an extremely narrow pH range. It has now been found that all of the above disadvantages can be eliminated and consistently satisfactory results obtained if a protamine precipitation such as disclosed by Christensen is performed in the presence of alkaline earth metal cations within a critical concentration.

According to the process of this invention a mixture of enzymes containing proteinaceous impurities is treated with .005 to 1.5 parts by weight of protamine per part by weight of total nitrogen in the protein mixture, in a 0.01 to 1.0 molar solution of an alkaline earth metal cation, said solution having a hydrogen ion concentration of between about pH 5.0 and pH 8.0, and a temperature of about 0° C. to 40° C. By this procedure many of the proteinaceous impurities are removed and as much as a ten-fold increase in purity of the enzyme material is obtained.

One of the advantages of the new procedure of this invention is that it is operable with any of the commercially available protamines. Protamine is defined as a mixture of simple basic proteins derived from the ripe sperm of fish. Some of the well known protamines are salmine from salmon sperm, sturine from sturgeon sperm, clupeine from herring sperm and scombrine from mackerel sperm. Within the sperm cell the protamine is combined with nucleic acid and it is, therefore, necessarily isolated as decomposition products of the substances present in the spermatozoa. The exact degree of decomposition can vary with the method of isolation. Since the protamines of commerce are usually mixtures of these decomposition products along with other impurities and since they are derived from many different sources, it is obvious that the commercially available protamines must of necessity vary widely in composition. While these variations caused difficulty in the method of the prior art, purifications by the new methods of this invention are not materially affected by wide variations in protamine composition.

Another advantage of the new procedure of this invention over the methods of the prior art is that it gives consistently satisfactory results with enzymes derived from practically any type of fermentation medium. The explanation appears to be that the alkaline earth metal ions hinder, for some unknown reason, the precipitation of the enzymes by protamine, but do not interfere with the precipitation by protamine of many of the proteinaceous impurities contained in the enzyme mixture. In fact, it would appear that the alkaline earth metal ions actually result in the precipitation of some of the proteinaceous impurities by the protamine that would not otherwise be precipitated. As it is often stated that a characteristic of protamine is that it precipitates all other proteins, it is indeed surprising that it can be employed so successfully in a protein purification procedure.

The following table is for the purpose of illustrating that even under circumstances where a protamine precipitation would ordinarily give unsatisfactory results, by the procedure of this invention highly satisfactory results can be obtained. A solution of proteins comprising streptokinase containing 150 milligrams of total nitrogen and contaminated with proteinaceous impurities was divided into three equal parts. To the first aliquot was added calcium chloride to make a 0.10 molar solution, to the second there was added calcium chloride to make a .05 molar solution and a third aliquot was kept as a control. The pH of all three solutions was adjusted to 5.6 and just enough 1% protamine solution (10 milligrams per 1 cc.) was added to the aliquot containing no calcium chloride to result in flocculation. This amount of protamine solution was also added to the other two aliquots although it was more than was necessary. An assay of the solution before any protamine was added indicated 20,000 units of streptokinase per aliquot.

*Table*

| Concentration of CaCl₂ | Mg. of protamine added | Units of SK in supernatant | Percent Recovery |
|---|---|---|---|
| 0.1 M | 40 | 12,000 | 60 |
| 0.05 M | 40 | 12,000 | 60 |
| None | 40 | 800 | 4 |

From the above table it will be seen that without the use of calcium chloride the attempted purification by protamine precipitation was a complete failure and resulted in practically all of the streptokinase being precipitated with the impurities. On the other hand, in the presence of calcium chloride the purification by protamine precipitation resulted in a 60% recovery of purified enzyme material. Equally satisfactory results have been obtained in the purification of protein mixtures containing other enzymes, for instance hyaluronidases and desoxyribonucleases.

The new procedure of this invention has the additional advantage, as indicated above, that smaller quantities of protamine are required. As protamine is a costly material, this results in an appreciable reduction in expense where the method is employed on a large scale. The method also has the advantage that it is operable over a larger pH range. This is often quite important as, for instance, in the purification of mixtures containing streptokinase. According to the methods of the prior art, mixtures containing streptokinase had to be precipitated at a pH of about 5.6 which resulted in a temporary inactivation of much of the streptokinase. The new procedure of this invention allows purification at a pH of 7.0 or even 8.0 and thus avoids this temporary inactivation and the resulting trouble of reactivation.

Other alkaline earth metal salts may also be employed to furnish the alkaline earth cations with satisfactory results. For instance in place of the calcium chloride in the above test there could have been employed the salts of other alkaline earth metals such as beryllium, magnesium, strontium, and barium. The acid from which the salt is formed is relatively immaterial as long as the salt is capable of furnishing the desired cations. For instance, salts with other halogen acids, with organic acids such as acetic and citric, and salts with other types of inorganic acids such as sulfuric and phosphoric may be employed. Salts of oxidizing acids such as nitric are not ordinarily used because the anion sometimes tends to oxidize the proteins. The salts should be employed in amounts sufficient to form a 0.01 to 1.0 molar solution and preferably in amounts sufficient to form a .05 to 0.10 molar solution. While a reasonable excess of salt is not unduly detrimental, it does necessitate the use of larger amounts of protamine and, therefore, the use of large amounts of salt is to be avoided.

The solution of enzyme material to be treated may comprise the untreated fermentation medium or it may comprise the fermentation medium as modified by prior treatment. For instance, the fermentation medium may be filtered to remove the microorganisms or it may be given special treatment to remove various impurities before being employed in the process of this invention. The solution of enzyme material to be treated may also comprise a reconstituted solution of partially purified enzymes.

The reasons for the success of the new procedure are not fully understood. One theory is that the protamine precipitates the impurities at hydrogen bonding and that the alkaline earth metal ions affect this phenomenon. But regardless of the reason or reasons for the highly advantageous results obtained by adding an alkaline earth metal salt to the protamine precipitation, it is not simply a question of ionic strength as salts of other metals, such as the alkali metals, do not have an identical effect. While alkali metal ions, such as sodium ions, tend to inhibit the precipitation of the enzymes, they also inhibit the precipitation impurities, which, of course, results in unsatisfactory purification.

The first step in the purification procedure usually comprises forming an aqueous solution of the enzyme or enzyme mixture to be purified. It is advantageous to prepare this aqueous solution of the enzyme material so that the combined nitrogen concentration is between 0.2 mg. and 1.0 mg. of nitrogen per 1 cc. of solution and preferably between about 0.4 and 0.6 mg. of nitrogen per 1 cc. volume. The temperature of the solution should then be brought to about 0° C. to 40° C. and the pH should be adjusted to within a range of about 5.0 to 8.0 and preferably to about 7.0 to 8.0. This solution may or may not contain alkaline earth cations as will be more fully explained in subsequent paragraphs. The enzyme solution is that ready for protamine treatment.

The protamine is preferably added in the form of an aqueous solution with a concentration of from 0.2% to 2%. A concentrated solution of the protamine is usually advantageous as this avoids undue dilution of the aqueous protein mixture. If the protein solution above contains no alkaline earth ions, then the protamine solution must contain such ions. The protamine should be added in an amount which is just sufficient to result in complete precipitation. As a general rule, satisfactory results are obtained by the addition of from about .005 to 1.5 parts by weight, depending upon the percentage of impurities in the protein mixture, of protamine per part by weight of total nitrogen in the protein mixture. Too little protamine results in a precipitation of only part of the impurities while the use of too large an amount of protamine leaves the excess protamine in solution and this may cause difficulty in subsequent purification. Of course, if too large an excess of protamine is used, it may cause precipitation of the desired substances. An advantageous procedure for determining a near optimum amount of protamine comprises adding protamine until, upon further addition, there is no apparent increase in the amount of precipitate, removing the precipitate and then adding a small additional amount of protamine to see if the solution remains clear. If one is dealing with large volumes, such a test can be run upon a few milliliters of the solution in a test tube and, from the result of this test, one can calculate the amount of protamine to be used for the remaining large volume of solution.

As indicated above, alkaline earth cations may be in either one or both of the two solutions. In other words, the protein solution can contain sufficient alkaline earth cations to give a resulting solution of the desired molarity when mixed with the protamine solution containing no alkaline earth ions; the protamine solution may contain sufficient alkaline earth ions to give a resulting solution of the desired molarity when mixed with the protein solution containing no alkaline earth ions; or both the protein and the protamine solutions may contain alkaline earth ions. In most instances it is advantageous to make both the protein and the protamine solutions to the desired alkaline earth ion concentration before the precipitation procedure is initiated as this eliminates the possibility of zones of low alkaline earth ion concentration which might otherwise occur during the precipitation. The metallic salt may be added to the two aqueous solutions after they are formed or the dried protein material and the dried protamine may be separately dissolved in or extracted with an alkaline earth salt solution of the desired molarity before temperature and hydrogen ion adjustments are made. The last mentioned has been found to be the preferred procedure.

After the impurities have been precipitated, they may be removed by any of the well known methods such as filtration or centrifugation. The remaining clear solution of purified enzymes may then be employed in further purification procedures or the enzymes therein may be recovered by vacuum evaporation of the solvent or by precipitation with any of the well known protein precipitants such as the lower alcohols.

The invention will be more particularly illustrated by the following example in which all parts are by weight unless otherwise indicated.

*Example*

To 7.3 liters of a mixture of enzymes comprising streptokinase and streptodornase there was added 5 molar calcium chloride until salt concentration of the enzyme solution was approximately 0.1 molar. The hydrogen ion concentration of the solution was then adjusted to approximately pH 5.6 and the temperature to 22° C. (room temperature). At this time the total nitrogen concentration of the solution was 0.56 mg. per cc. or a total of 4.1 grams.

To the above solution there was added slowly with stirring a second solution having approximately the same hydrogen ion concentration and temperature and comprising 4.6 grams of protamine in 500 cc. of 0.1 molar calcium chloride. Clouding occurred immediately and after a few minutes there was a heavy precipitate of impurities. The precipitate was removed by centrifugation leaving a clear solution of the enzymes. An assay of the solution for activity and total nitrogen indicated that about 80% of the streptokinase and about 90% of the streptodornase had been retained with an approximate ten-fold increase in purity. The enzymes were then recovered from the solution by alcoholic precipitation.

The procedure for the purification of other enzymes or enzyme mixtures is substantially identical to the above. The above example employed a mixture of streptokinase and streptodornase but the procedure of the example may be used for purifying streptokinase or streptodornase alone or for purifying other kinases and desoxyribonucleases, produced by the fermentation of microorganisms. Also, in place of the calcium chloride in the above example, an equal molar quantity of other alkaline earth metal salts, for instance magnesium chloride, barium chloride, calcium sulfate, calcium acetate, calcium citrate and calcium phosphate can be substituted with satisfactory results.

We claim:

1. A method of purifying enzymes selected from the group consisting of kinases and desoxyribonucleases produced by the fermentation of microorganisms which method comprises treating the enzyme material with .005 to 1.5 parts by weight of protamine per part by weight of total nitrogen in said enzyme material, in a 0.01 to 1.0 molar solution of an alkaline earth metal cation, at a temperature of about 0° C. to about 40° C. and at a hydrogen ion concentration from about pH 5.0 to about pH 8.0, and removing the resulting precipitate of impurities.

2. The method of claim 1 wherein the enzyme material to be purified comprises a kinase.

3. The method of claim 1 wherein the enzyme material to be purified comprises a desoxyribonuclease.

4. The method of claim 1 wherein said enzyme mixture to be purified comprises a mixture of streptokinase and streptodornase.

5. The method of claim 1 wherein the alkaline earth metal cations are calcium ions.

6. A method of purifying mixtures of streptokinase and streptodornase which comprises treating the enzyme material with .005 to 1.5 parts by weight of protamine per part by weight of total nitrogen in said enzyme mixture in a .05 to 0.10 molar solution of calcium ions, at a temperature of 0° C. to 40° C. and at a hydrogen ion concentration from about pH 7.0 to about pH 8.0, and removing the resulting precipitate of impurities.

7. A method of purifying enzymes selected from the group consisting of kinases and desoxyribonucleases produced by fermentation of microorganisms which method comprises forming a 0.01 to 1.0 molar alkaline earth salt solution of said enzyme material, adjusting the hydrogen ion concentration of said solution to between pH 5.0 and pH 8.0, adjusting the temperature of said solution to between 0° C. and 40° C. and adding to said solution a second solution containing from 0.2% to 2% protamine until no further precipitation of impurities is obtained, said second solution having substantially the same alkaline earth salt concentration, hydrogen ion concentration and temperature as said solution of enzyme material, and removing the resulting precipitate of impurities.

8. The method of claim 7 wherein said alkaline earth metal salt is calcium chloride.

9. The method of claim 7 wherein said alkaline earth metal salt is magnesium chloride.

10. A method of purifying mixtures comprising streptokinase and streptodornase which comprises forming a solution of said mixture in a 0.01 to 1.0 molar alkaline earth metal salt solution so that the combined nitrogen in said solution is between 0.2 milligram and 1.0 milligram of nitrogen per cubic centimeter of solution, adjusting the hydrogen ion concentration of said solution to between pH 5.0 and pH 8.0 and the temperature of said solution between 0° C. and 40° C., adding protamine to said solution until there is no further precipitation of impurities, and removing the precipitate of impurities.

11. The method of claim 10 wherein said protamine is added as a 0.2% to 2% solution having substantially the same alkaline earth salt concentration, hydrogen ion concentration and temperature as said solution of streptokinase and streptodornase.

12. The method of claim 10 wherein said alkaline earth metal salt is calcium chloride.

13. The method of claim 10 wherein said hydrogen ion concentration is between pH 7.0 and pH 8.0 and the temperature of said solution is between 0° C. and 20° C.

14. The method of claim 10 wherein said alkaline earth metal salt is magnesium chloride.

References Cited in the file of this patent

Christensen: J. Gen. Physiol., volume 30, pages 465 to 473 (1947), C. A. volume 41, page 7428 (1947).